United States Patent
Bareis et al.

(10) Patent No.: US 9,752,687 B2
(45) Date of Patent: Sep. 5, 2017

(54) VALVE FOR AN EXHAUST GAS LINE OF AN INTERNAL COMBUSTION ENGINE

(71) Applicant: BorgWarner Esslingen GmbH, Esslingen am Neckar (DE)

(72) Inventors: Bernd Bareis, Täferrot-Utzstetten (DE); Julian Haselmaier, Bempflingen (DE); Patrick Wilde, Weilheim/Teck (DE)

(73) Assignee: BorgWarner Esslingen GmbH, Esslingen am Neckar (DE)

( * ) Notice: Subject to any disclaimer, the term of this patent is extended or adjusted under 35 U.S.C. 154(b) by 9 days.

(21) Appl. No.: 14/836,269

(22) Filed: Aug. 26, 2015

(65) Prior Publication Data
US 2016/0061333 A1 Mar. 3, 2016

(30) Foreign Application Priority Data

Aug. 28, 2014 (DE) .................. 10 2014 112 398

(51) Int. Cl.
*F16K 1/22* (2006.01)
*F16K 1/226* (2006.01)
*F16K 31/06* (2006.01)
*F02B 47/08* (2006.01)

(52) U.S. Cl.
CPC ............ *F16K 1/2263* (2013.01); *F02B 47/08* (2013.01); *F16K 31/0655* (2013.01); *Y02T 10/121* (2013.01)

(58) Field of Classification Search
CPC .... F16K 1/2263; F16K 31/0655; F16K 1/226; F16K 1/2268; F02B 47/08; Y02T 10/121

USPC .................................................. 251/305, 306
See application file for complete search history.

(56) References Cited

U.S. PATENT DOCUMENTS

| 2,987,072 A | * | 6/1961 | Muller | .................. F16K 1/2263 |
| | | | | 251/110 |
| 5,741,006 A | * | 4/1998 | Murai | ...................... F16K 1/221 |
| | | | | 251/305 |
| 6,138,988 A | * | 10/2000 | Bouvet | ...................... F02D 9/10 |
| | | | | 251/306 |

(Continued)

FOREIGN PATENT DOCUMENTS

| DE | 199 53 198 A1 | 5/2001 |
| DE | 10 2011 119 139 A1 | 5/2013 |

(Continued)

*Primary Examiner* — Marina Tietjen
(74) *Attorney, Agent, or Firm* — Bose McKinney & Evans LLP

(57) ABSTRACT

An exhaust line valve for an internal combustion engine. A closure body is arranged in a duct of the valve and is fastened to a shaft. The closure body when closed separates upstream and downstream duct sections. Two projections extend into the duct, each having a valve seat pointing in an opposite direction of the duct. By pivoting the closure body from its closed position, the sealing surfaces of the closure body are raised from their respective valve seats. A polymer seal is arranged on the valve seats and in the closed position the polymer seal sealingly contacts the associated sealing surface of the closure body. A circumferential surface of the shaft or the closure body is located in an edge region of the closure body. The polymer seal contacts in a sealing manner at least a region of the circumferential surface facing the upstream section of the duct.

16 Claims, 4 Drawing Sheets

(56) References Cited

U.S. PATENT DOCUMENTS

| | | | | |
|---|---|---|---|---|
| 7,392,826 | B2* | 7/2008 | Schub | F02D 9/1015 |
| | | | | 123/337 |
| 8,136,793 | B2* | 3/2012 | Keller-Staub | F16K 51/02 |
| | | | | 123/336 |
| 2007/0131889 | A1* | 6/2007 | Unbehaun | F02D 9/04 |
| | | | | 251/305 |
| 2013/0167815 | A1 | 7/2013 | Bareis | |
| 2013/0299728 | A1 | 11/2013 | Yokoyama et al. | |

FOREIGN PATENT DOCUMENTS

| | | |
|---|---|---|
| DE | 11 2011 105 111 T5 | 1/2014 |
| DE | 10 2013 101 302 A1 | 8/2014 |

\* cited by examiner

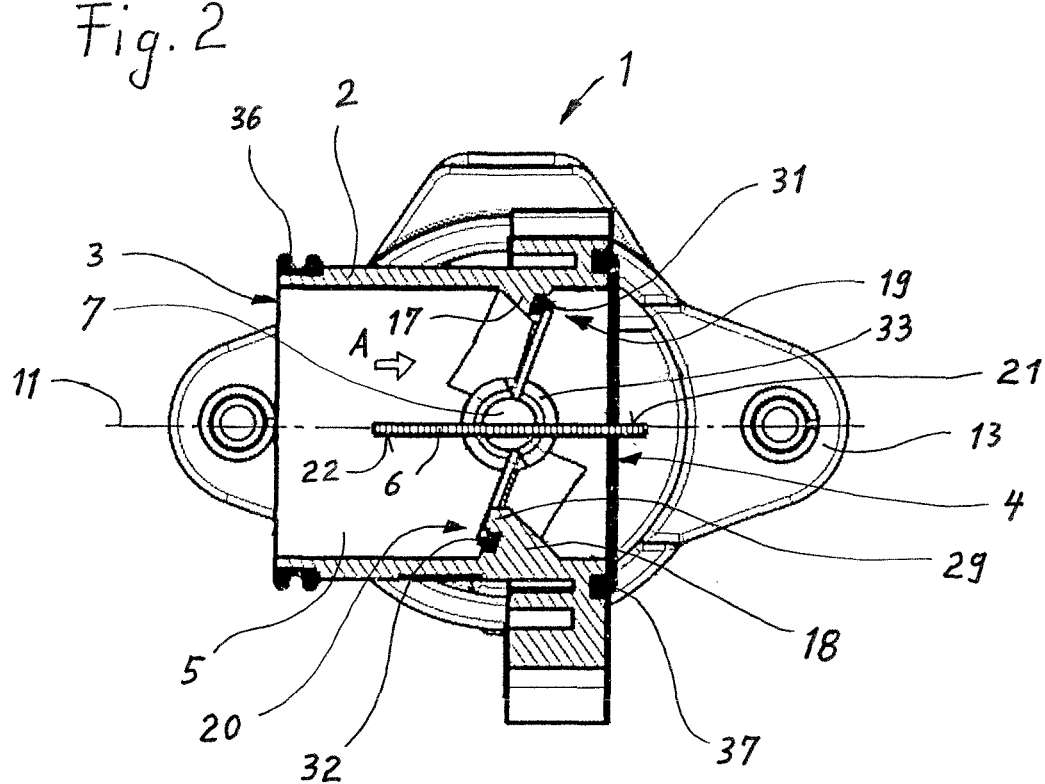

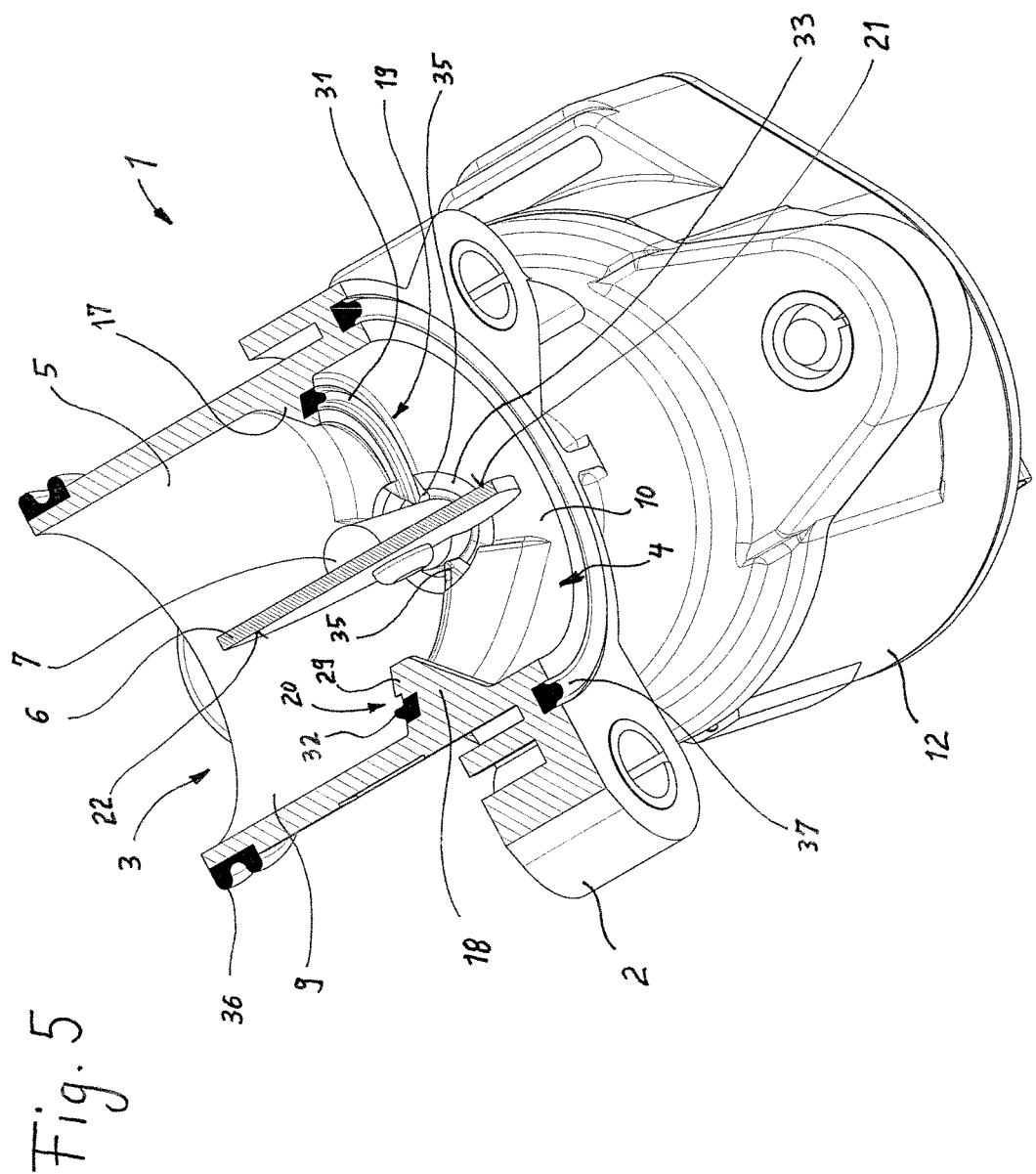

VALVE FOR AN EXHAUST GAS LINE OF AN INTERNAL COMBUSTION ENGINE

RELATED APPLICATIONS

This application claims priority to DE 10 2014 112 398.0, filed Aug. 28, 2014, the entire disclosure of which is hereby incorporated herein by reference in its entirety.

BACKGROUND

The invention relates to a low pressure flap valve for an exhaust gas line of an internal combustion engine. Such low pressure flap valves are generally known from DE 10 2011 119 139 A1 and DE 10 2013 101 302 A1 and are used particularly for controlling the exhaust gas return in internal combustion engines in motor vehicles. The closure body of the valve is a flap which is fastened in a torque-proof manner on a shaft and is pivoted by an electromagnetic actuating drive connected directly to the shaft. By pivoting the flap, the mass flow of the returned gas can be controlled. Such flap valves have, with a relatively small overall size, a relatively large free cross-section and thereby enable a high mass throughput with a small pressure drop. They are therefore preferably used when exhaust gas is taken from the low pressure exhaust gas line. From the outlet opening of the valve, the exhaust gas can preferably be fed to the fresh air flow, which is fed to the internal combustion engine, for example upstream of a compressor.

An exhaust gas return is used in order to reduce the emissions of the internal combustion engine, in particular nitrogen oxides and other pollutants. The legal emission requirements for internal combustion engines, in particular for those in motor vehicles, have already increased greatly in recent years, especially in Europe and North America and will be further tightened considerably in the coming years.

SUMMARY

This disclosure teaches an improved valve by which internal combustion engines achieve reduced emissions.

The valve according to this disclosure is a low pressure valve and can be used as an exhaust gas return valve in the exhaust gas return. The valve has a housing with an inlet opening and an outlet opening and with a duct for the directing of exhaust gases from the inlet opening to the outlet opening. The inlet opening can be connected with a low pressure exhaust gas line of the internal combustion engine. The exhaust gas temperatures prevailing there are substantially lower than in the high pressure exhaust gas line and lie at approximately 160° C. to 180° C. The outlet opening of the valve can be connected with a fresh air duct, which feeds to the internal combustion engine the fresh air necessary for the combustion, in particular in a region downstream the fresh air has passed through an air filter and upstream the fresh air enters into a compressor. A closure body is arranged in the duct, which closure body is fastened in a torque-proof manner to a shaft, and preferably consists of metal. The closure body is pivotable about the rotation axis of the shaft and has a closed position, in which it separates an upstream section of the duct from a downstream section of the duct. The valve according to this disclosure is therefore a flap valve. The valve is used for controlling an exhaust gas mass flow, which is returned to the internal combustion engine.

On the inner wall of the duct, in the region of the closure body, two elongated projections are arranged, which project into the duct and extend by their longitudinal direction in circumferential direction of the duct. One of the projections is situated in the upstream section of the duct and the other projection is situated in the downstream section of the duct. The projections are therefore situated on opposite sides of the closure body. Each of the projections has a valve seat pointing in a longitudinal direction of the duct, wherein the two valve seats point in opposite directions. The closure body has two sealing surfaces, each of which, in the closed position of the closure body, lies against one of the valve seats and, by pivoting of the closure body from its closed position, is able to be raised from the respective valve seat. The sealing surfaces are arranged on opposite sides of the closure body.

The valve can have an electromagnetic actuating drive connected with the shaft, which can sit directly on the shaft as a direct drive. The electromagnetic actuating drive can contain a magnet rotor which is connected to the shaft in a torque-proof manner. It can also contain a coil body penetrated by the shaft. On the end of the shaft facing away from the closure body a sensor element can be arranged in order to measure the current pivoting angle of the closure body. The shaft can be mounted rotatably in the housing on only one side of the closure body. The mounting may contain a ball bearing arranged between the closure body and the magnet rotor, which ball bearing is arranged in particular close to the magnet rotor, in order to be able to reliably receive the high magnetic forces.

The valve according to this disclosure contains a seal made of a polymer, which is arranged on the valve seats. The seal is elastic and particularly consists of an elastomer, in particular of a fluororubber (FKM), which is particularly peroxidically cross-linked. The seal is temperature-resistant, particularly up to 200° C., and resistant with respect to the aggressive substances present in the exhaust gas. The seal is fastened to the projection belonging to the respective valve seat, and in the closed position of the closure body is contacted in a sealing manner by the associated sealing surface of the closure body. In the region of an edge of the closure body, a circular-cylindrical circumferential surface (also referred to herein as a "circumferential surface") is arranged coaxially to the shaft on the shaft or on the closure body. In the case of a continuous shaft, this circular-cylindrical circumferential surface can be formed directly by the circumferential surface of the shaft. This may be advantageous in particular when the closure body, as in the case of the valve disclosed in DE 10 2013 101 302 A1, is constructed as a plate which is placed in a slot running radially through the shaft. In particular when the closure body, as in the case of the valve disclosed in DE 10 2011 119 139 A1, is constructed as a shaped part with a hole, in which the shaft is placed, it can be advantageous to arrange a sleeve-shaped section at the edge of the closure body, which sleeve-shaped section surrounds the shaft coaxially and contains the said circular-cylindrical circumferential surface.

According to this disclosure, the seal extends in circumferential direction of the circular-cylindrical circumferential surface and contacts in a sealing manner at least the region of the circular-cylindrical circumferential surface facing the upstream section of the duct. The seal is preferably constructed in one piece, but can also be formed from several sections separate from one another, which lie against one another in a sealing manner.

The valve according to this disclosure has substantial advantages (but which are not necessary):

a. With a valve according to this disclosure, the amount of the exhaust gas which is returned to the internal combustion engine can be controlled precisely, so that neither too much nor too little exhaust gas is returned. An exhaust gas return serves per se to reduce nitrogen oxides and other pollutants. If, however, the mass flow of the exhaust gas which is returned to the internal combustion engine is too high, increased soot formation, higher fuel consumption and lower performance of the internal combustion can occur. An increased soot formation leads to the soot filter present in modern diesel engines becoming clogged more quickly. An increased fuel consumption increases the carbon dioxide emissions in an undesirable manner.

b. With the valve according to this disclosure, a very precise control of the mass flow of the returned exhaust gas can be achieved. In particular in the case of an internal combustion engine running under high load, the mass flow of the exhaust gas returned to the internal combustion engine can be reduced in a defined way in a necessary manner for modern engines, such that, in particular also at full load, no more than the desired amount of exhaust gas is returned. Hereby, the emissions of the internal combustion engine, in particular at full load, can be reduced, because too high an amount of returned exhaust gas does not enable an optimum combustion here.

c. Maintaining the principle of a flap valve, which is favorable with regard to fluid engineering, the leakage mass flow of the exhaust gas, which despite a closure body pivoted in closed position can still arrive from the inlet opening to the outlet opening of the valve, can be very greatly reduced in the valve according to this disclosure. In particular, a leakage path running radially around the shaft is closed. With a valve according to this disclosure, a leakage mass flow of below two kilograms per hour can be achieved, which can preferably be reduced even to below one kilogram per hour.

d. In modern engines, additional catalysts and arrangements for exhaust gas treatment, for example with the addition of ammonia, are arranged in the low pressure exhaust gas line. These catalysts and arrangements are arranged in the exhaust gas line downstream the connection point of the inlet opening of the valve according to this disclosure. The catalysts and arrangements for exhaust gas treatment increase the flow resistance in the exhaust gas line, so that the pressure present at the inlet opening of the valve increases. In these cases, a valve according to this disclosure is also still very well able to control the exhaust gas mass flow precisely and, at the same time, to ensure the required small leakage mass flow with a closure body situated in the closed position.

e. The seal prevents a direct contact between the closure body and the housing. This reduces corrosion on the closure body and/or on the housing brought about by the exhaust gases, when the housing and/or the closure body consist of metal, in particular aluminium. Even if a corrosive attack were to take place on a sealing surface of the closure body and unevennesses were to arise there, the seal, owing to its elasticity, can balance out these unevennesses and thereby prevent the leakage from increasing.

Particularly, the seal surrounds the entire circumference of the said circular-cylindrical circumferential surface arranged on the shaft or on the closure body, and contacts in a sealing manner the circular-cylindrical circumferential surface along its entire circumference. This may have an advantage in that the seal also seals the passage in the wall of the duct, through which the shaft extends to its bearing and the actuating drive. A separate bearing seal can thereby be dispensed with. It may be advantageous if the seal is fastened to the wall of the duct in its section lying against the circular-cylindrical circumferential surface and on pivoting of the closure body slides over the circular-cylindrical circumferential surface. This may have an advantages in that the cross-section of the shaft is not weakened by a groove, that the shaft is able to be produced more simply and that the seal does not move in the housing on pivoting of the closure body.

In further embodiment, the seal has, in a section which lies between its section lying against the circular-cylindrical circumferential surface and a section fastened to one of the projections, a sealing lip extending in axial direction of the circular-cylindrical circumferential surface, which sealing lip lies in a sealing manner against the circular-cylindrical circumferential surface and slides over the circular-cylindrical circumferential surface on pivoting of the closure body. Hereby, the leakage path running radially around the shaft may be sealed particularly well and a particularly low leakage mass flow may be achieved. Through the sealing lip, therefore, a very good sealing of the closure body in its closed position may be achieved. Particularly, between the sealing lip and the circular-cylindrical circumferential surface only a linear contact takes place, which is oriented parallel to the rotation axis of the shaft. Thereby, only a small friction occurs on the contact line, which guarantees a long lifespan of the seal and low hysteresis losses. Fluctuations of current in the actuating drive, which can occur on approaching a particular pivoting angle of the closure body depending on whether this pivoting angle is approached from the opened position or from the closed position of the closure body, are designated as "hysteresis losses." When the hysteresis losses are small, the control of the actuating drive is simplified.

Particularly, the shaft is rotatably mounted only on one side of the closure body in the housing. Although, in this embodiment, the shaft does not need to extend beyond the edge of the closure body facing away from the bearing and also no separate shaft stub is necessary there, because the entire bearing of the shaft is situated only on one side of the closure body, it is advantageous in such an embodiment if the valve has two circular-cylindrical circumferential surfaces (also referred to herein as "circumferential surfaces"), one of which is arranged near an edge of the closure body facing the bearing of the shaft and the other is arranged near an edge of the closure body facing away from the bearing of the shaft, wherein the seal lies in a sealing manner against both circular-cylindrical circumferential surfaces. Hereby, a particularly good and simple sealing of the closure body in its closed position is ensured in a region which is situated on the side of the closure body lying opposite the bearing, between the two projections and the wall of the duct. The circular-cylindrical circumferential surface according to this disclosure can be formed near the edge of the closure body facing away from the bearing in that the shaft extends there beyond the edge of the closure body. It can also be formed in that a circular-cylindrically shaped region, for example a shaft stub, is formed or mounted there on the closure body. The seal can be constructed—with respect to a plane lying perpendicularly to the rotation axis of the shaft—in the region of an edge of the closure body facing away from the bearing of the shaft, in a mirror-inverted manner to its construction in the region of an edge of the closure body facing the bearing of the shaft.

The housing can consist of a temperature-resistant glass-fibre-reinforced thermoplastic, in particular of a glass-fibre-reinforced PA 6 or PPA. Hereby, the weight of the housing can be reduced and thereby the fuel consumption of the internal combustion engine arranged in a motor vehicle can be reduced. In addition, the corrosion resistance of the valve is further increased. It may be advantageous to produce the seal and the housing in a two-component injection molding process. Here, firstly, the housing is injected from the housing material. Subsequently, the seal of an elastomer, described above, is injected directly onto the housing at the appropriate position in the housing. Particularly, a substance-to-substance bonded connection occurs here between the housing material and the material of the seal. This may enable a very simple production of the housing. A separate mounting of the seal is dispensed with. Also, further seals can be additionally injected on the housing, for example a seal surrounding the inlet opening, a seal surrounding the outlet opening and/or a seal on a flange provided for fastening the actuating drive to the housing.

In a further embodiment, provision can be made that the circumferential surface arranged near the edge of the closure body facing the bearing of the shaft has a greater diameter than the circumferential surface arranged near the edge of the closure body facing away from the bearing of the shaft. This can simplify the production of the seal, in particular in the two-component injection molding process, because also the respective internal diameters of the seal differ and therefore the injection mould can be configured more simply.

In a further embodiment of this disclosure, the valve can only have one stop for delimiting the pivoting movement of the closure body, deforming the seal elastically, on reaching its closed position. A single stop for delimiting the pivoting movement of the closure body may ensure that the closed position of the closure body is defined very precisely and can also be taken up again precisely and reproducibly after each opening. On pivoting of the closure body into its closed position, the sealing surfaces of the closure body firstly touch the seal in the region of the valve seats. On further pivoting of the closure body, the seal is deformed there elastically. With progressive elastic deformation, the counterforce exerted by the seal onto the closure body increases. This counterforce is, however, dependent on the elasticity of the seal, which can alter as a function of the temperature and in the course of time. A force-controlled closing of the closure body would therefore lead to different closed positions, so that the opening point of the valve, when the closure body is pivoted out from its closed position, would move with the changing elasticity of the seal and the control of the mass flow of the returned exhaust gas would become imprecise. The stop according to this disclosure ensures that the closure body, situated in its closed position, always has the same angular position with respect to the longitudinal direction of the duct. The closure body situated in its closed position therefore deforms the seal sections arranged on the valve seats by a predefined amount, which is always of equal size irrespective of the elasticity of the seal. The torque which is applied onto the shaft for the pivoting of the closure body into its closed position, is selected to be so great that the counterforces exerted by the seal on pivoting are reliably overcome and the closure body is always pivoted so far until the stop is reached. Particularly, the stop acts directly on the closure body, so that the closure body, on reaching its closed position, strikes against the stop. Particularly, the stop can be mounted on one of the projections, in particular when the stop is mounted on the projection which has the valve seat pointing to the upstream section of the duct. The excess pressure prevailing in the upstream section of the duct then supports the holding of the closure body in its closed position.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIG. 2 is a sectional view along the section plane II-II of FIG. 1 through the valve;

FIG. 5 is a perspective illustration of a valve cut along the section plane II-II of FIG. 1.

DESCRIPTION

Figure 1:
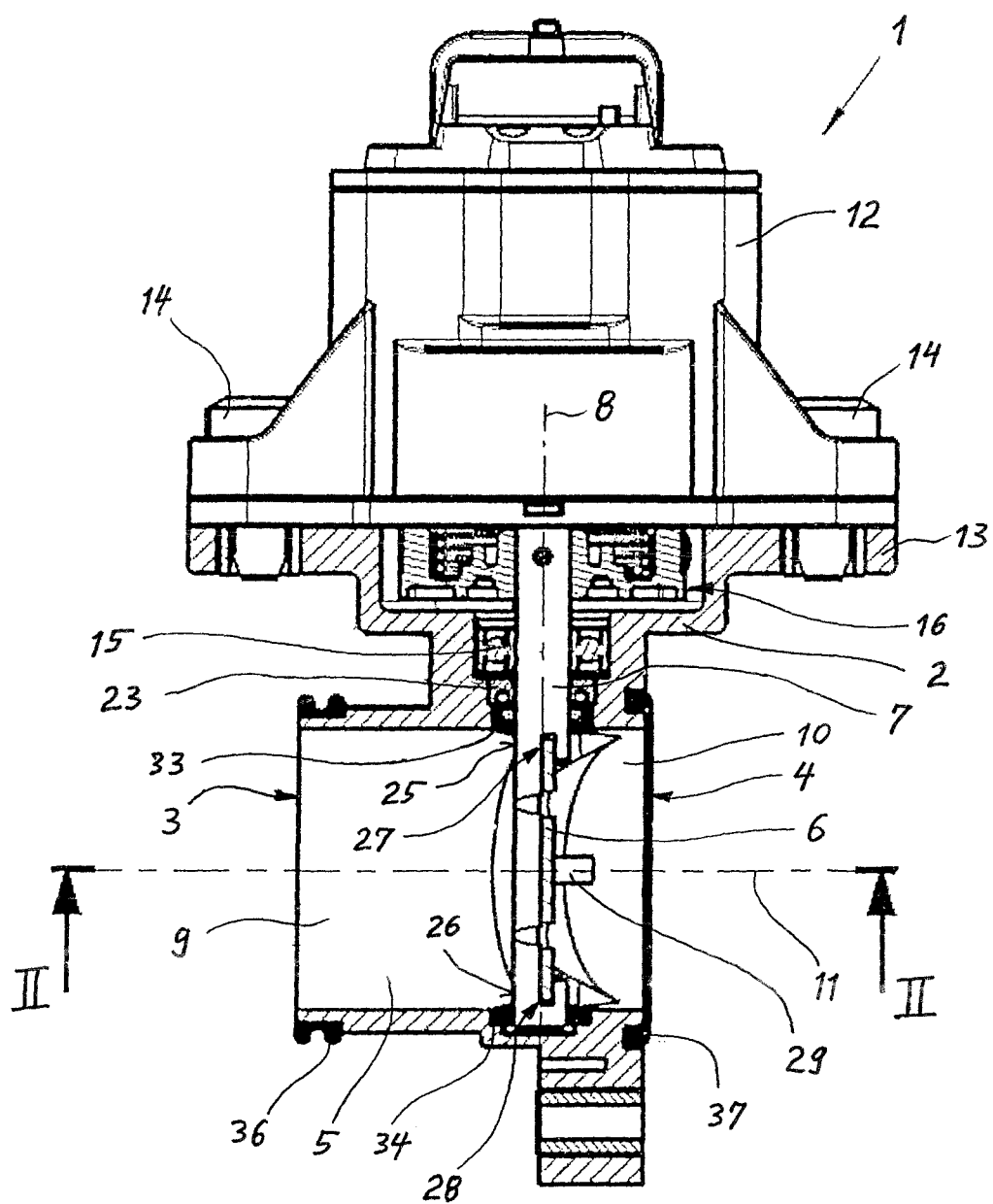
FIG. 1 is a sectional view through a valve according to this disclosure.

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

A valve 1 for an exhaust gas line of an internal combustion engine has a housing 2 with an inlet opening 3 and an outlet opening 4. The housing 2 contains a duct 5 for the directing of exhaust gases from the inlet opening 3 to the outlet opening 4. In the duct 5 a closure body 6 is arranged, which is constructed as a flap. The closure body 6 is fastened in a torque-proof manner to a shaft 7 and is pivotable about the rotation axis 8 of the shaft. The closure body has a closed position, in which it separates an upstream section 9 of the duct 5 from a downstream section 10 of the duct 5.

In FIGS. 2 and 5, the closure body 6 is illustrated in opened position. Exhaust gases from a low pressure exhaust gas line of a motor vehicle, which is not illustrated, which is connected with the inlet opening 3 in a manner which is not illustrated, can flow through the duct 5 in flow direction A and via the outlet opening 4, which is connected with a fresh air duct of the motor vehicle in a manner which is not illustrated, can be returned to the internal combustion engine of the motor vehicle again. In its position illustrated in FIG. 2, the closure body 6 is opened to a maximum extent. The closure body 6 is parallel here to the longitudinal direction 11 of the duct 5. The duct 5 has a circular cross-section. The closure body 6 is constructed as a plate and has a circular or elliptical outer contour.

In FIG. 1 the closure body 6 is illustrated in its closed position. The closure body 6 is oriented transversely to the longitudinal direction 11 of the duct 5 and blocks the duct 5 so that the passage from the inlet opening 3 to the outlet opening 4 is closed.

The valve 1 has an electromagnetic actuating drive 12, connected with the shaft 7, which drive contains in a manner which is not illustrated but is known per se, a magnet rotor, connected in a torque-proof manner with the shaft 7, and a coil body penetrated by the shaft. The housing 2 contains a flange 13 on which the actuating drive 12 is fastened with screws 14. The shaft 17 is supported only on one side of the closure body 6 in the housing, namely via a ball bearing 15. A further bearing, not illustrated, for the shaft 7 can be arranged within the actuating drive 12. No bearing is situated on the side of the closure body 6 lying opposite the ball bearing 15. In the housing 2, in addition, a resetting device 16 is arranged, which pivots the closure body 6 into its closed position when the actuating drive 12 is not activated or fails.

On the inner wall of the duct 5 in the region of the closure body 6, two elongated projections 17 and 18 are arranged, which project into the duct 5 and extend by their longitudinal direction in circumferential direction of the duct 5. The projection 17 is situated in the upstream section 9 of the duct 5 and the projection 18 is situated in the downstream section 10 of the duct 5. The projections 17, 18 therefore lie on opposite sides of the closure body 6. The projection 17 has a valve seat 19, which points in the longitudinal direction 11 to the downstream section 10 of the duct 5. The projection 18 has a valve seat 20, which points in longitudinal direction 11 to the upstream section 9 of the duct 5. The closure body 6 has two sealing surfaces 21, 22 for abutment on the valve seats 19, 20. In closed position of the closure body 6, the sealing surface 21 lies against the valve seat 19 and the sealing surface 22 lies against the valve seat 20. By pivoting the closure body 6 out from its closed position, the sealing surfaces 21, 22 are raised from their respective valve seat 19, 20. The sealing surfaces 21 and 22 are arranged on opposite sides of the closure body 6.

Figure 4:
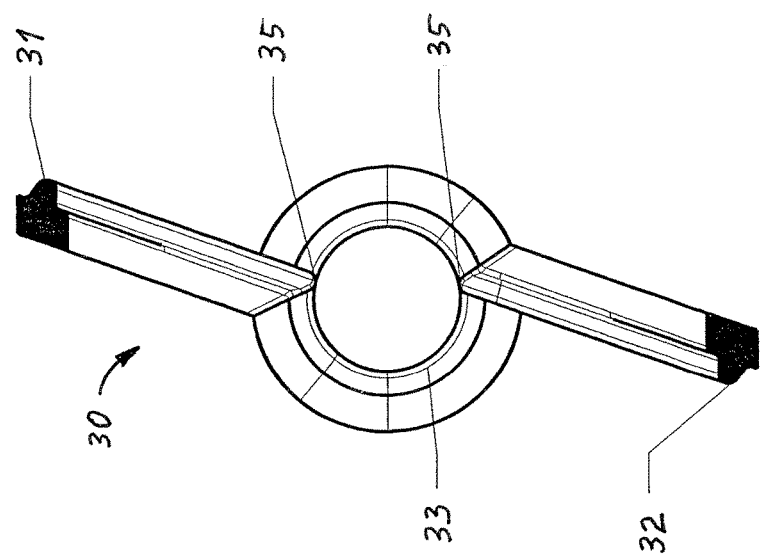
FIG. 4 shows the seal of the valve in a view according to FIG. 2 in enlarged illustration.
Figure 3:
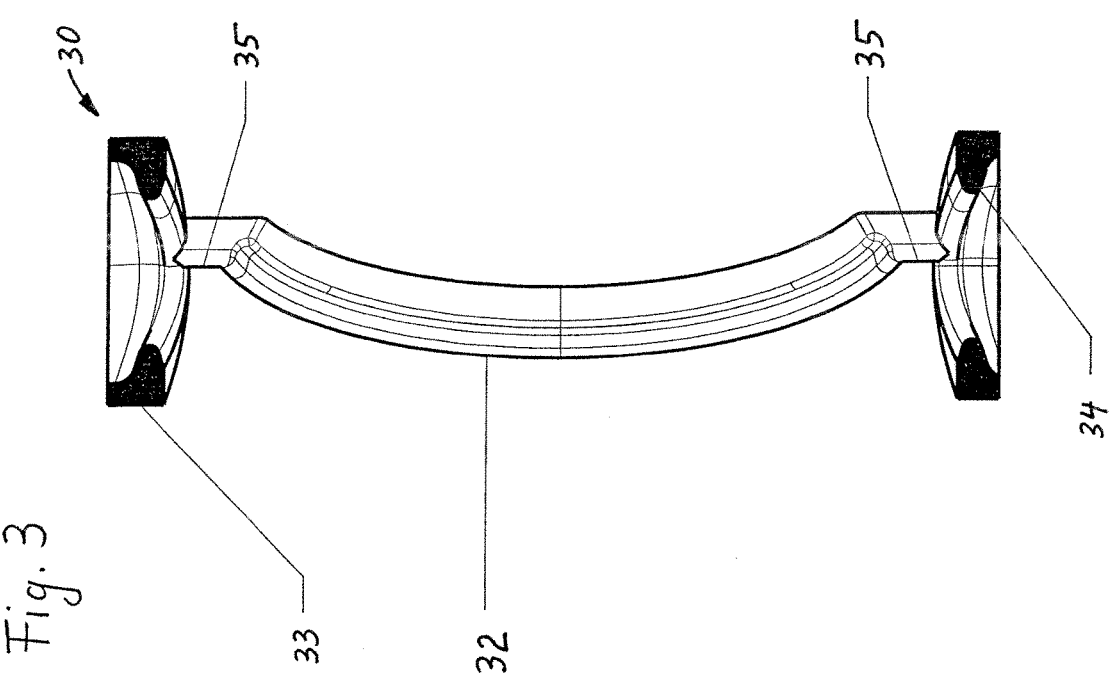
FIG. 3 shows the seal of the valve in a view according to FIG. 1 in enlarged illustration.

The valve 1 contains a seal 30, which can be seen in particular in FIGS. 3 and 4. The seal 30 is constructed in one piece, consists of FKM and has a plurality of functional sections 31, 32, 33, 34, 35. The seal 30 could, however, also be configured in several parts, for example by the individual functional sections 31, 32, 33, 34 and/or 35 being embodied as separate seals which lie against one another in a sealing manner. For the sake of simplicity, mention is made below of "seals 31, 32, 33, 34, 35", even if these are preferably connected with one another in one piece.

On the valve seat 19 a seal 31 is arranged, which is fastened to the projection 17 and in the closed position of the closure body 6 is contacted in a sealing manner by the sealing surface 21. A seal 32 is arranged on the valve seat 20 and is fastened on the projection 18. In the closed position of the closure body 6, the seal 32 is contacted in a sealing manner by the sealing surface 22. The projections 17, 18 each have a groove-shaped duct for receiving the seal 31, 32, which duct extends in longitudinal direction of the respective projection 17, 18.

In the region of an edge of the closure body 6 facing the bearing 15, a circular-cylindrical circumferential surface (also referred to herein as "circumferential surface") 25 is arranged. A circular-cylindrical circumferential surface (also referred to herein as "circumferential surface") 26 is arranged in the region of an edge of the closure body 6 facing away from the bearing 15. The circular-cylindrical circumferential surfaces 25, 26 are formed by the cylindrical outer contour of the shaft 7. The circular-cylindrical circumferential surface 26 can be formed alternatively also by a shaft stub separate from the shaft 7, which can be fastened on the closure body 6. A seal 33 extends in the circumferential direction of the circular-cylindrical circumferential surface 25, surrounds the entire circumference of the circular-cylindrical circumferential surface 25 and contacts in a sealing manner the circular-cylindrical circumferential surface 25 along its entire circumference. A seal 34 extends in circumferential direction of the circular-cylindrical circumferential surface 26, surrounds the entire circumference of the circular-cylindrical circumferential surface 26 and contacts in a sealing manner the circular-cylindrical circumferential surface 26 along its entire circumference. The seals 33, 34 are fastened to the wall of the duct 5 and, on pivoting of the closure body 6, slide over their respective circular-cylindrical circumferential surface 25, 26. Even when the seal 33 already seals the bearing 15, in addition a shaft sealing ring 23 can be provided between the seal 33 and the bearing 15 to improve the sealing.

At the transition from the seal 32 to the seal 33 a sealing lip 35 is arranged. The sealing lip 35 extends in axial direction of the circular-cylindrical circumferential surface 25. The sealing lip 35 contacts in a sealing manner the circular-cylindrical circumferential surface 25 and, on pivoting of the closure body 6, slides over the circular-cylindrical circumferential surface 25. In the same manner, a sealing lip 35 is arranged respectively between the seals 32 and 34, 31 and 33 as well as 31 and 34. Through the sealing lips 35, a particularly good sealing of the closure body 6 in its closed position is ensured.

Furthermore, a seal 36 surrounding the inlet opening 3 and a seal 37 surrounding the outlet opening 5 are arranged on the housing 2. The housing 2 is produced as an injection moulded part of PPA GF 50. The seals 30 to 37 are injected onto the housing 2 by two-component injection molding process. A further seal (not illustrated) can be mounted on the surface of the flange 13 facing the actuating drive 12. All seals 30 to 37 are connected with one another by connecting ducts running in the housing, which are not illustrated in the figures for reasons of simplification. The connecting ducts can run on or under the surface of the housing and make it possible that the seals 30 to 37 can be injected from one sprue.

As can be seen in FIG. 1, the shaft 7 is slotted, in order to receive the closure body 6. In the region of the circular-cylindrical circumferential surface 25 a slot 27 is arranged, which passes radially through the shaft 7 and in which the closure body 6 is placed. In the region of the circular-cylindrical circumferential surface 26 a slot 28 is arranged, which passes radially through the shaft 7 and in which the closure body 6 is placed. The circular-cylindrical circumferential surfaces 25, 26 adjoin the respective slot 27, 28 and are partially penetrated by it. Near the edge of the closure body 6, facing the bearing 15, through the combination of the circular-cylindrical circumferential surface 25, the seal 33, the slot 27 and the two sealing lips 35 lying against the circular-cylindrical circumferential surface 25, a particularly good seal and a very small leakage mass flow is ensured. The same applies in an analogous manner for the combination 26, 34, 28 and 35 near the edge of the closure body 6 facing away from the bearing 15.

On pivoting of the closure body 6 into its closed position, its sealing surfaces 21, 22 firstly touch the seals 31, 32. On further pivoting of the closure body 6, the seals 31, 32 are pressed together elastically. The valve has a single stop 29 for delimiting the pivoting movement of the closure body 6 elastically deforming the seal 30 on reaching its closed position. The stop 29 is arranged on the projection 18, which has the valve seat 20 pointing to the upstream section 9 of the duct 5. The closure body 6 strikes against the stop 29 on reaching its closed position. The closed position is therefore not defined by the seals 31, 32, but rather by the stop 29. The closure body 6 does not touch the projection 17.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SIGNS

| | |
|---|---|
| 1 | valve |
| 2 | housing |
| 3 | inlet opening |
| 4 | outlet opening |
| 5 | duct |
| 6 | closure body |
| 7 | shaft |
| 8 | rotation axis |
| 9 | upstream section |
| 10 | downstream section |
| 11 | longitudinal direction |
| 12 | actuating drive |
| 13 | flange |
| 14 | screws |
| 15 | ball bearing |
| 16 | resetting device |
| 17 | projection |
| 18 | projection |
| 19 | valve seat |
| 20 | valve seat |
| 21 | sealing surface |
| 22 | sealing surface |
| 23 | shaft sealing ring |
| 25 | circumferential surface |
| 26 | circumferential surface |
| 27 | slot |
| 28 | slot |
| 29 | stop |
| 30 | seal |
| 31 | seal |
| 32 | seal |
| 33 | seal |
| 34 | seal |
| 35 | sealing lips |
| 36 | seal |
| 37 | seal |
| A | flow direction |

What is claimed is:

1. A valve for an exhaust gas line of an internal combustion engine, comprising:
   a housing with an inlet opening and an outlet opening and a duct for directing exhaust gases from the inlet opening to the outlet opening;
   a closure body arranged in the duct and fastened in a torque-proof manner to a shaft, the closure body being pivotable about the rotation axis of the shaft and having a closed position in which the closure body separates upstream and downstream sections of the duct;
   two elongated projections arranged on an inner wall of the duct in the region of the closure body, the projections extending in a circumferential direction of the duct, one of the projections being situated in an upstream section of the duct and the other projection being situated in a downstream section of the duct;
   each of the projections having a valve seat pointing in the longitudinal direction of the duct, the two valve seats pointing in opposite directions;
   the closure body having two sealing surfaces arranged on opposite sides thereof, wherein each sealing surface in the closed position of the closure body lies against one of the valve seats and, by pivoting the closure body from its closed position, the sealing surfaces are raised from their respective valve seats;
   a polymer seal arranged on the valve seats, wherein in the closed position of the closure body, the polymer seal is contacted in a sealing manner by the associated sealing surface of the closure body;
   a circumferential surface formed on the shaft or on the closure body and located in a region of an edge of the closure body; and
   the polymer seal contacting in a sealing manner at least a region of the circumferential surface facing the upstream section of the duct.

2. The valve according to claim 1, in which the seal surrounds the entire circumference of the circumferential surface and contacts in a sealing manner the circumferential surface along its entire circumference.

3. The valve according to claim 1, in which the seal in its section lying against the circumferential surface is fastened to the wall of the duct and on pivoting of the closure body slides over the circumferential surface.

4. The valve according to claim 1, in which the seal, in a section which lies between its section lying against the circumferential surface and a section fastened to one of the projections, has a sealing lip extending in axial direction of the circumferential surface, which sealing lip contacts in a sealing manner the circumferential surface and on pivoting of the closure body slides over the circumferential surface.

5. The valve according to claim 1, in which the seal is formed in one piece.

6. The valve according to claim 1, in which the shaft is rotatably supported on only one side of the closure body in the housing.

7. The valve according to claim 6, wherein the circumferential surfaces comprises two circumferential surfaces, one of which being arranged near an edge of the closure body facing a bearing of the shaft and the other being arranged near an edge of the closure body facing away from the bearing of the shaft, wherein the seal contacts in a sealing manner both circumferential surfaces.

8. The valve according to claim 1, in which the shaft has at least one slot passing radially through the shaft, the closure body being placed in the slot, the slot adjoining the circumferential surface.

9. The valve according to claim 1, in which the seal is an elastomer.

10. The valve according to claim 9, further comprising a single stop for delimiting the pivoting movement of the closure body, elastically deforming the seal, on reaching its closed position.

11. The valve according to claim 9, in which the closure body strikes against the stop on reaching its closed position.

12. The valve according to claim 9, in which the stop is mounted on the projection which has the valve seat pointing to the upstream section of the duct.

13. The valve according to claim 1, in which the housing is formed from a temperature-resistant, glass-fiber-reinforced thermoplastic.

14. The valve according to claim 1, in which the seal and the housing are produced in a two-component injection molding process.

15. A valve for an exhaust gas line of an internal combustion engine, comprising:
   a housing with an inlet opening and an outlet opening and a duct for directing exhaust gases from the inlet opening to the outlet opening;
   a closure body arranged in the duct and fastened in a torque-proof manner to a shaft, the closure body being pivotable about the rotation axis of the shaft and having a closed position in which the closure body separates upstream and downstream sections of the duct;

two elongated projections arranged on an inner wall of the duct in the region of the closure body, the projections extending in a circumferential direction of the duct, one of the projections being situated in an upstream section of the duct and the other projection being situated in a downstream section of the duct;

each of the projections having a valve seat pointing in the longitudinal direction of the duct, the two valve seats pointing in opposite directions;

the closure body having two sealing surfaces arranged on opposite sides thereof, wherein each sealing surface in the closed position of the closure body lies against one of the valve seats and, by pivoting the closure body from its closed position, the sealing surfaces are raised from their respective valve seats;

a polymer seal arranged on the valve seats, wherein in the closed position of the closure body, the polymer seal is contacted in a sealing manner by the associated sealing surface of the closure body;

a circumferential surface formed on the shaft or on the closure body and located in a region of an edge of the closure body; and the polymer seal contacting in a sealing manner at least a region of the circumferential surface facing the upstream section of the duct, wherein the seal in its section lying against the circumferential surface is fastened to the wall of the duct and on pivoting of the closure body slides over the circumferential surface.

16. A valve for an exhaust gas line of an internal combustion engine, comprising:

a housing with an inlet opening and an outlet opening and a duct for directing exhaust gases from the inlet opening to the outlet opening;

a closure body arranged in the duct and fastened in a torque-proof manner to a shaft, the closure body being pivotable about the rotation axis of the shaft and having a closed position in which the closure body separates upstream and downstream sections of the duct;

two elongated projections arranged on an inner wall of the duct in the region of the closure body, the projections extending in a circumferential direction of the duct, one of the projections being situated in an upstream section of the duct and the other projection being situated in a downstream section of the duct;

each of the projections having a valve seat pointing in the longitudinal direction of the duct, the two valve seats pointing in opposite directions;

the closure body having two sealing surfaces arranged on opposite sides thereof, wherein each sealing surface in the closed position of the closure body lies against one of the valve seats and, by pivoting the closure body from its closed position, the sealing surfaces are raised from their respective valve seats;

a polymer seal arranged on the valve seats, wherein in the closed position of the closure body, the polymer seal is contacted in a sealing manner by the associated sealing surface of the closure body;

a circumferential surface formed on the shaft or on the closure body and located in a region of an edge of the closure body; and the polymer seal contacting in a sealing manner at least a region of the circumferential surface facing the upstream section of the duct;

wherein the seal, in a section which lies between its section lying against the circumferential surface and a section fastened to one of the projections, has a sealing lip extending in axial direction of the circumferential surface, which sealing lip contacts in a sealing manner the circumferential surface and on pivoting of the closure body slides over the circumferential surface.

* * * * *